Feb. 10, 1942.  C. J. CHALUPOWSKI  2,272,545
AUTOMATIC RADIO CONTROL
Filed Dec. 19, 1939  9 Sheets-Sheet 1

INVENTOR.
Chester J. Chalupowski
BY Dike, Calver & Gray
ATTORNEYS

Feb. 10, 1942. C. J. CHALUPOWSKI 2,272,545
AUTOMATIC RADIO CONTROL
Filed Dec. 19, 1939 9 Sheets-Sheet 2

INVENTOR.
Chester J. Chalupowski
BY
Dike, Calver & Gray
ATTORNEYS

Feb. 10, 1942.   C. J. CHALUPOWSKI   2,272,545
AUTOMATIC RADIO CONTROL
Filed Dec. 19, 1939   9 Sheets-Sheet 3

Inventor.
Chester J. Chalupowski
By Dike, Calver & Grey
Attorneys

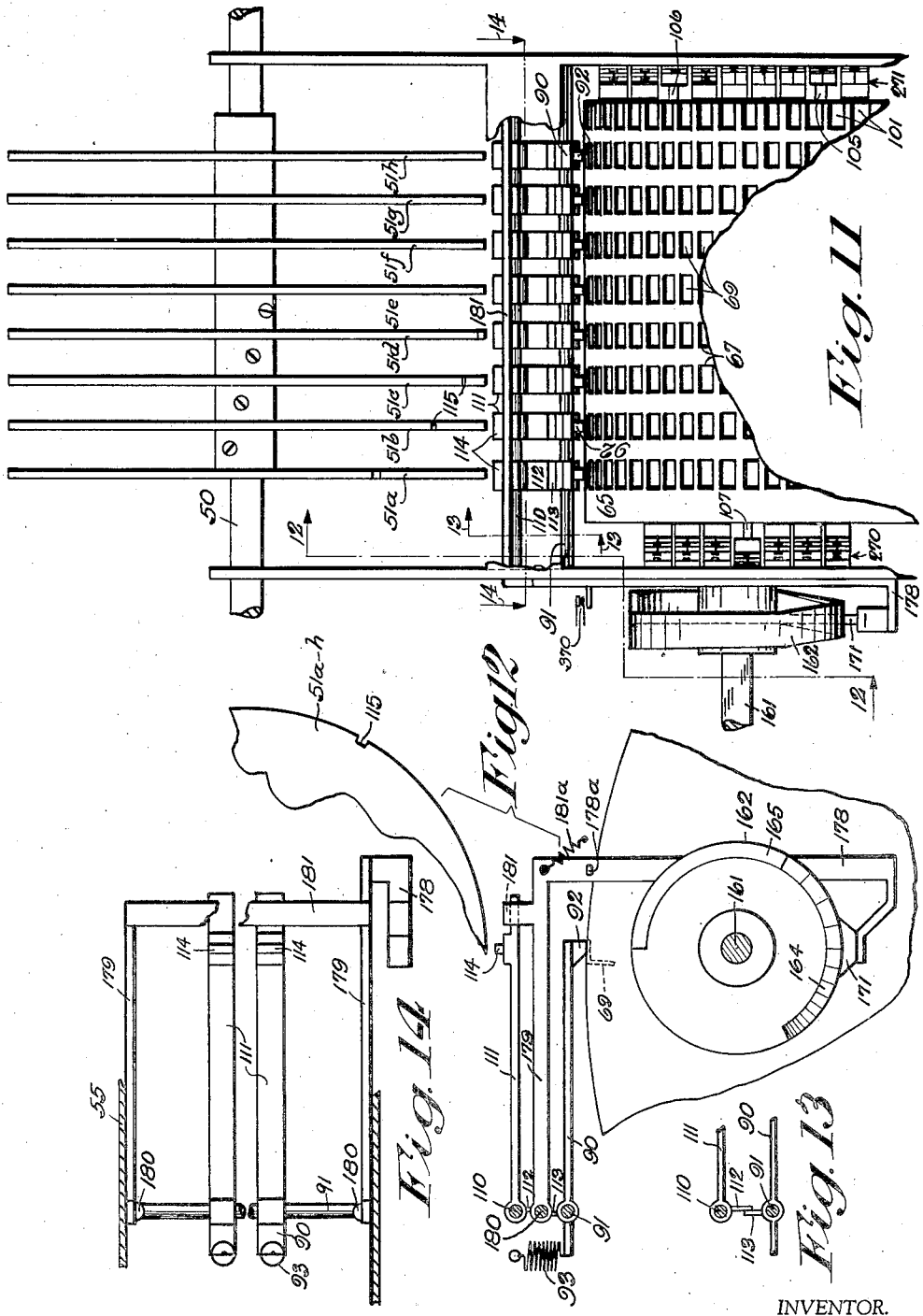

Feb. 10, 1942.  C. J. CHALUPOWSKI  2,272,545
AUTOMATIC RADIO CONTROL
Filed Dec. 19, 1939  9 Sheets-Sheet 5

INVENTOR.
Chester J. Chalupowski
BY
Dike, Calver & Grey
ATTORNEYS

Feb. 10, 1942.  C. J. CHALUPOWSKI  2,272,545
AUTOMATIC RADIO CONTROL
Filed Dec. 19, 1939  9 Sheets-Sheet 6
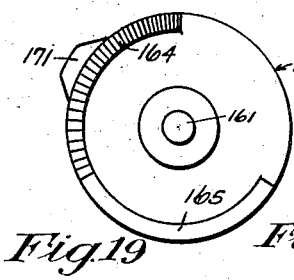
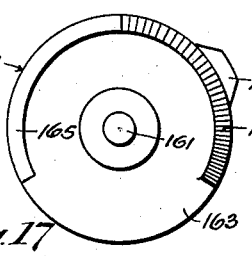
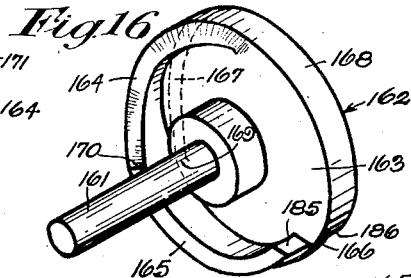
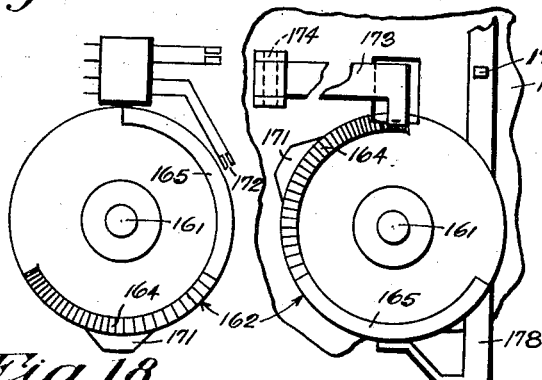
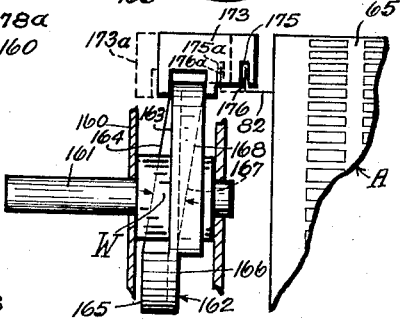
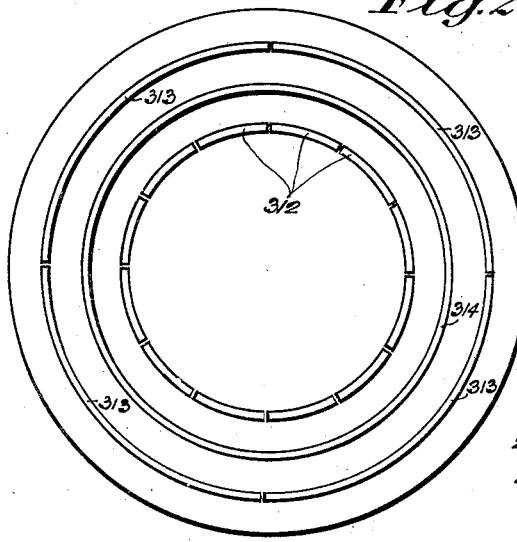
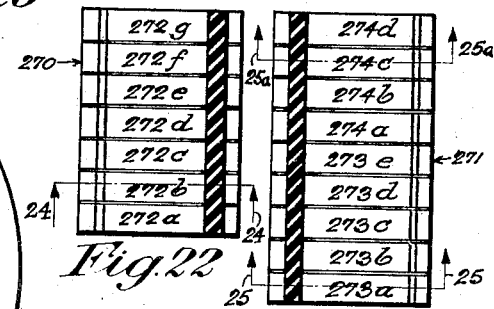
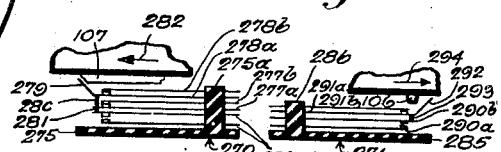
Inventor:
Chester J. Chalupowski
By Dike, Calver & Gray
Attorneys.

Feb. 10, 1942.  C. J. CHALUPOWSKI  2,272,545
AUTOMATIC RADIO CONTROL
Filed Dec. 19, 1939  9 Sheets-Sheet 7
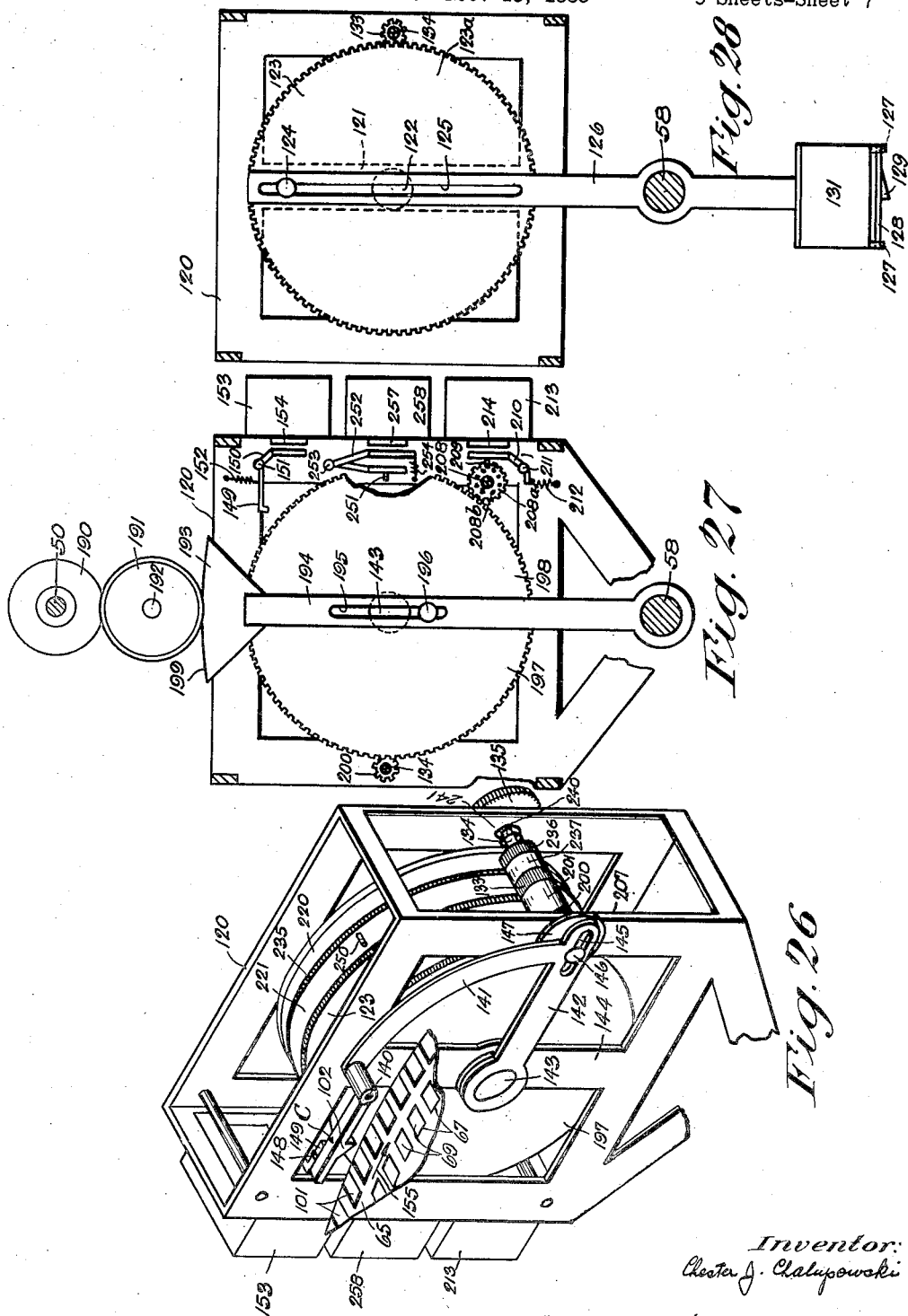
Inventor:
Chester J. Chalupowski
By
Dike, Calver & Gray
Attorneys.

Feb. 10, 1942.  C. J. CHALUPOWSKI  2,272,545
AUTOMATIC RADIO CONTROL
Filed Dec. 19, 1939  9 Sheets-Sheet 8
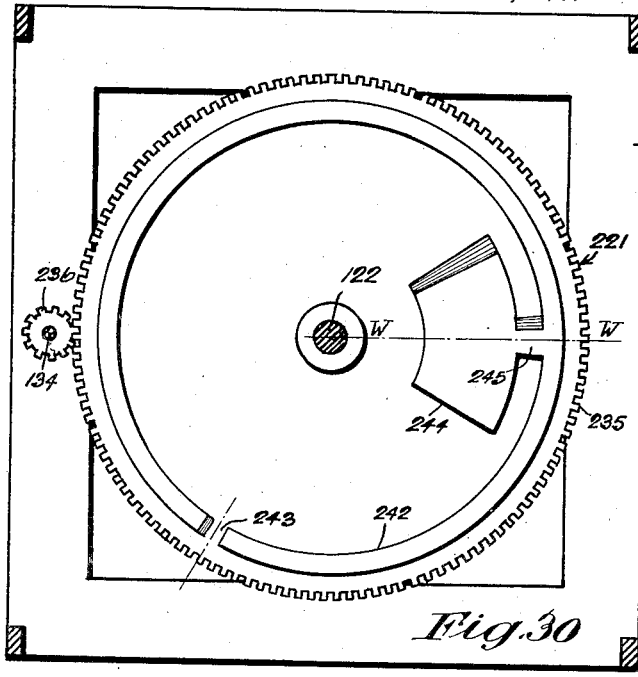
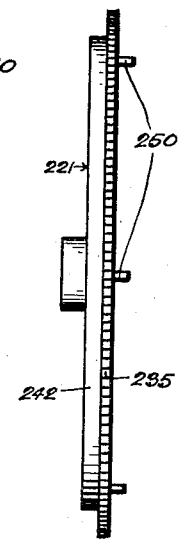
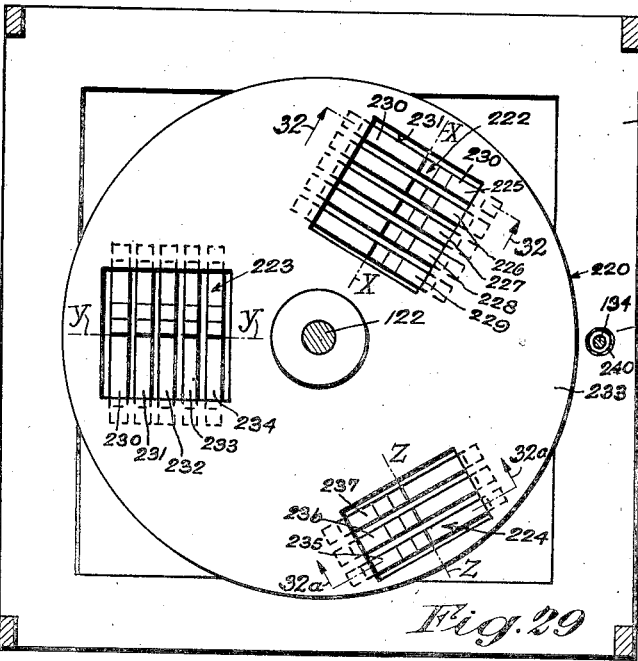
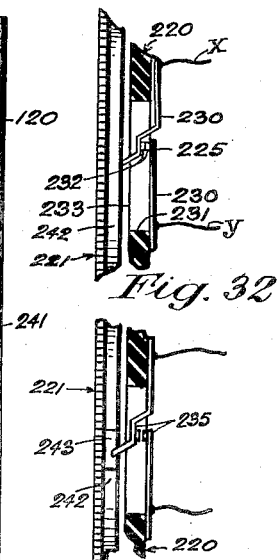
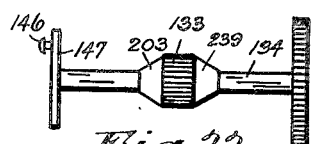
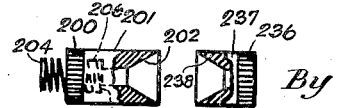
Inventor:
Chester J. Chalupowski
By Dike, Calver & Grey
Attorneys.

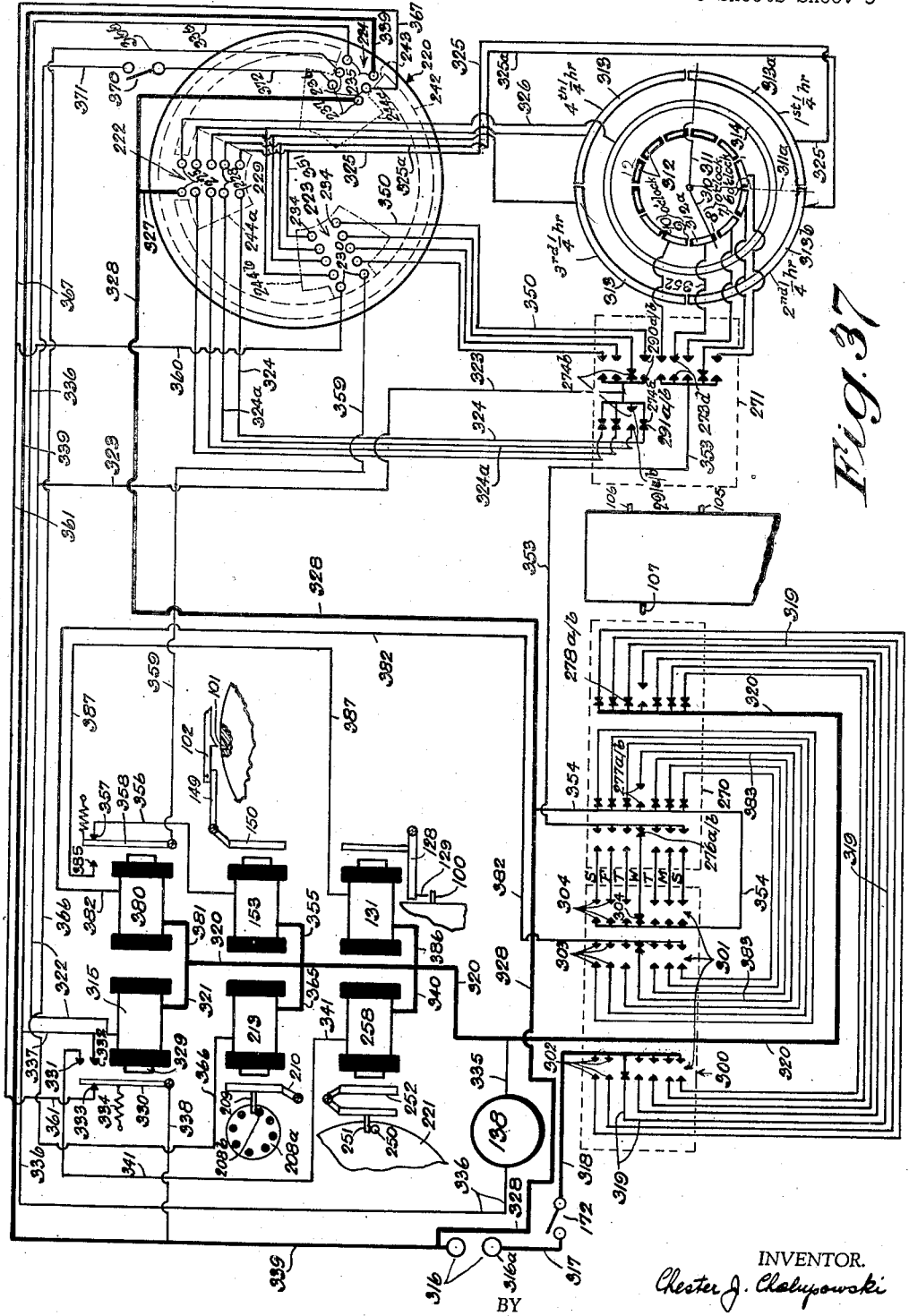

Patented Feb. 10, 1942

2,272,545

UNITED STATES PATENT OFFICE 2,272,545

AUTOMATIC RADIO CONTROL

Chester J. Chalupowski, Salem, Mass.

Application December 19, 1939, Serial No. 310,004

5 Claims. (Cl. 161—1)

This invention relates to apparatus for automatically operating radio receivers in accordance with a preselected program schedule.

Most people have a preferred selection of radio programs which they like to hear. Such a selection may, for instance, consist of one or more daily broadcasts, one or more weekly broadcasts, a one-time broadcast of particular interest which is usually announced several days ahead of broadcast time, etc. To miss none of the preselected broadcasts requires perhaps more perseverance than most people care to exercise, particularly if the selection covers several days or even weeks. Thus, it happens frequently that one or more programs are missed simply because the selector forgot to tune in these programs at broadcast time. To aid radio listeners in the execution of their preselections, various apparatus have been devised which automatically tune in the station or stations at the exact time when the selected programs are broadcast. Most of these apparatus cover only one day's schedule, however, and hardly serve as a reminder to tune in recurring weekly broadcasts or a future one-time broadcast, which are more liable to be missed than a broadcast in a single day's schedule. It has also been proposed to automatically tune in the selections for several days or perhaps a week by controlling an automatic tuning device by means of a plurality of daily recording plates or records which are automatically changed every day in a predetermined sequence, and each of which is preadjustable to effect tuning of a preselected program schedule for a single day. While this accomplishes the automatic recording of programs for as many days as there are records, i. e., until the latter have performed once in their proper sequence, repeated manual rearrangements of these records for repeat performances in the proper sequence, as for recording recurrent weekly broadcasts, for instance, are required.

It is the primary aim and object of the present invention to provide an apparatus which, after initial adjustment to a selected radio schedule for a whole week, will automatically and without further adjustment or manipulation, except turning on the radio receiver and setting the same for automatic reception, render the selected broadcasts for an indefinite length of time, i. e., until the apparatus is adjusted to a different broadcast or broadcasts.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 11 is an enlarged, fragmentary view of part of the apparatus shown in Fig. 1.

Fig. 12 is a fragmentary section, taken substantially on the line 12—12 of Fig. 11.

Fig. 13 is a fragmentary section, taken substantially on the line 13—13 of Fig. 11.

Fig. 14 is a fragmentary section, taken substantially on the line 14—14 of Fig. 11.

Fig. 16 is a perspective view of a certain manually operable element of the automatic control.

Figs. 17, 18 and 19 show the element of Fig. 16 in its different positions of operation.

Fig. 20 shows the same element in cooperation with other elements of the automatic control.

Fig. 21 is a fragmentary side elevation, partly in section, of the cooperating elements shown in Fig. 20.

Figs. 22 and 23 illustrate two different switch boards of the automatic control.

Figs. 24, 25 and 25a are sections, taken on the lines 24—24 of Fig. 22, 25—25 and 25a—25a of Fig. 23, respectively.

Fig. 26 is a perspective view of a certain device of the automatic control.

Figure 1:
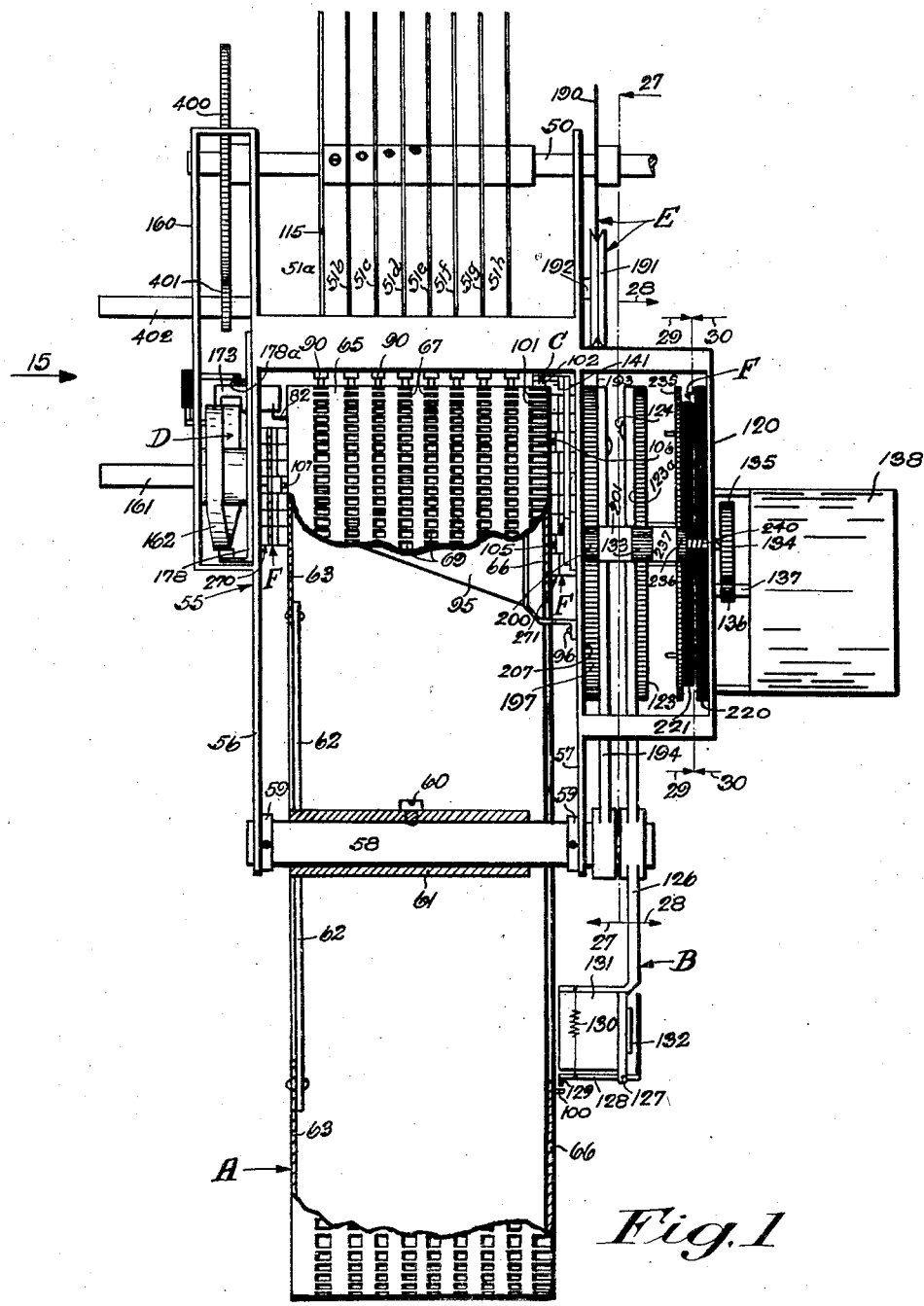
Fig. 1 is an elevational view, partly in section, of an automatic radio control which embodies the present invention.

Figs. 27 and 28 are sections through the device of Fig. 26, the sections being taken substantially on the lines 27—27 and 28—28, respectively, of Fig. 1.

Fig. 29 is an enlarged section through the device shown in Fig. 26, the section being taken substantially on the line 29—29 of Fig. 1.

Fig. 30 is another enlarged section through the device shown in Fig. 26, the section being taken substantially on the line 30—30 of Fig. 1.

Fig. 31 is a side elevation of an element shown in Fig. 30.

Fig. 32 is a fragmentary section on the line 32—32 of Fig. 29, showing a switch and a therewith cooperating element, the latter being also shown in fragmentary section.

Fig. 32a is a fragmentary section similar to Fig. 32, but taken on the line 32a—32a of Fig. 29.

Figs. 33, 34 and 35 are elevational views, partly in section, of certain elements in the device shown in Fig. 26.

Fig. 36 illustrates a certain element of the automatic control.

Fig. 37 is a wiring diagram showing the various electrical circuits of the automatic control and their connections.

Referring to the drawings and more particularly to Fig. 1 thereof, there is shown a preferred embodiment of a radio control which is adapted automatically to tune in certain pre-selected programs by turning, at broadcast time, the shaft 50 of a gang condenser in a radio receiver (neither shown) as is customary in tuning radio receivers. In the present instance, programs from eight different stations may be selected as indicated by the eight station disks 51a–h on the condenser shaft 50. For a clearer understanding of the present automatic control, the same is preferably divided into the following sections for the purpose of description:

Control drum A (Fig. 1);
Day drum index mechanism B (Fig. 1);
Quarter hour drum index mechanism C (Figs. 1 and 26);
Main control disk D (Fig. 1);
Tuning device E (Fig. 1); and
Circuit controllers F (Fig. 1).

*Control drum A*

Referring to Fig. 1, the automatic radio control comprises a main frame 55 which may be constructed in any suitable manner and is preferably mounted in the cabinet of a radio receiver so as to be hidden from view. Journalled in suitable bearings, provided by spaced, depending arms 56 and 57 of the frame 55 is a shaft 58 which is held against axial movement by means of collars 59 which abut the frame arms 56 and 57. Mounted on the shaft 58, as by a set screw 60, is a hub 61 which is provided at one end with a plurality of radial arms 62 to which is secured in any suitable manner a ring-shaped disk 63 concentrically to the shaft 58. Secured in any suitable manner to this disk 63 is the inturned flange 64 at one side of a cylindrical mantle 65 (Fig. 4) which forms the periphery of the control drum. Suitably secured to the other side of the cylindrical mantle 65 in the manner shown in Fig. 4, for instance, is another ring-shaped disk 66. It will now be understood that the hub 61 with its spokes 62 sustains the control drum, i. e., the ring-shaped disks 63 and 66 and the cylindrical mantle 65.

Figure 2:
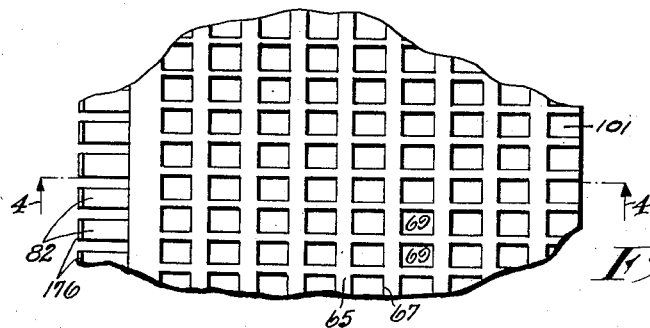
Fig. 2 is a fragmentary view of the periphery of a control drum which is part of the automatic control.
Figure 4:
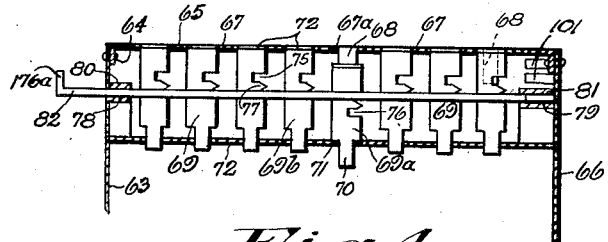
Fig. 4 is a fragmentary section, taken substantially on the line 4—4 of Fig. 2.
Figures 6, 7, 7A:
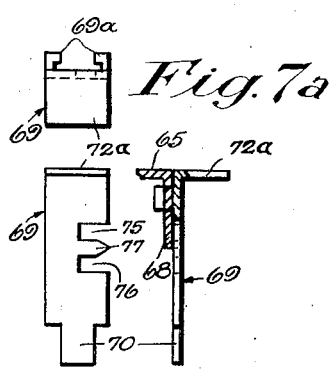
Figs. 6 and 7 are enlarged front and side elevational views, respectively, of a certain element in the drum.
Fig. 7a is a plan view of the element shown in Figs. 6 and 7.

The entire drum periphery 65 is provided with a plurality of orderly disposed slots 67, having depending punched-out tongues 68 (Fig. 7) which serve as guides for the gibs 69a of fillers 69 for movement of the latter radially of the drum. These fillers have reduced inner ends 70 which are guided also for movement radially of the drum in correspondingly shaped slots 71 in an inner cylindrical mantle 72 of the drum which is concentric to the outer drum periphery 65. Each filler 69 may be brought into either one of two positions, i. e., the position 69a in Fig. 4 in which the corresponding slot 67a is exposed, and the position 69b in which the projecting flanges 72a of the fillers (Figs. 6 and 7) are flush with the drum periphery 65 and completely close their respective slots when viewed from the outside. As shown in Figs. 1, 2 and 4, there are eight slots 67 in each of a number of axial rows, each slot in an axial row representing a different selective broadcast station. The slots 67 are also disposed in eight peripheral rows, each slot in a peripheral row representing a selective quarter hour broadcast period of a selective station. Any one of the fillers 69 in an axial row of slots 67 may be preset, i. e., depressed into the position 69a in Fig. 4 in order to expose its respective slot 67 and thereby condition the drum for a broadcast on a certain day of the week for a certain quarter-hour period. To this end, each filler 69 is provided with two notches 75 and 76 which are separated by a tooth 77 (Figs. 4 and 6). Guided for longitudinal movement in ways 78 and 79, provided in annular rings 80 and 81, respectively, on the drum disks 63 and 66, respectively, are a plurality of bars 82 of which each one is adapted to cooperate with the fillers 69 in an axial row of slots 67.

Figure 3:
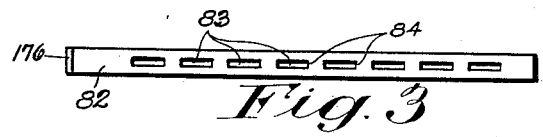
Fig. 3 is a plan view of a certain element in the drum.

As best shown in Fig. 3, each bar is provided with longitudinally spaced slots 83 which correspond in number to that of the fillers in each axial row of slots 67. If a bar 82 is moved to the left as viewed in Fig. 4 into the position shown therein, the marginal end portions 84 thereof enter whichever notches 75 or 76 of the fillers 69 happen to be in alinement with said bar and thus lock the fillers 69 in either one of the positions 69a or 69b shown in Fig. 4. Conversely, on moving the bar 82 to the right as viewed in Fig. 4 until the bar slots 84 clear the notches 75 or 76 of the fillers 69, the latter are free to be moved into either one of the positions 69a or 69b in Fig. 4, as will be readily understood.

As each one of the slots 67 in an axial row represents a different station but the same quarter-hour broadcast time on the same day, it stands to reason that only one of the slots 67 in an axial row is exposed as indicated at 67a in Fig. 4, for instance. The remaining slots 67 in the same axial row are covered by the fillers in the positions 69b, thereby preventing the automatic tuning of another, non-selected program from another station.

The drum is usually preset or conditioned for rendition of preselected radio programs at broadcast time which may be several days or a week hence. As the present automatic control is designed to cover broadcast time for each day of the week, the peripheral rows of slots 67 on the drum are divided into sections of which each section is assigned for a different day of the week. Moreover, since the broadcast time for each day has to be at least several hours to allow a wide selection of programs, and inasmuch as some programs last 15 minutes and other programs last a whole hour, for instance, each daily section provides in each peripheral row sufficient quarter-hour slots 67 to cover the requisite number of hours broadcast time each day. Thus, where it is desired to condition the drum for a half-hour broadcast from a certain station at a certain time within the time range of the control and on a certain day, two consecutive slots commensurate with said time and within the proper day section of slots as well as in the proper station-identifying peripheral row of slots, are exposed. If a selected program from a certain station lasts an hour, it stands to reason that four consecutive slots 67 commensurate with the broadcast time and in the proper peripheral station row and proper day section must be exposed, so that the radio receiver will be automatically tuned to said station at the proper time and for a period corresponding to the number of exposed consecutive quarter-hour slots, which is four in the present instance and covers one hour. If the pre-selection calls, for instance, for a quarter hour program of one station to be followed immediately by a half hour program of another station, the proper exposed slot in the proper peripheral station row for the quarter hour program is immediately followed peripherally of the drum by two consecutive, exposed slots in another peripheral station row commensurate with said other station, as will be readily understood. Thus, the drum may be conditioned for future automatic reception of any number of programs.

The present automatic control is, by way of example, designed to cover five hours broadcast time each day during which any number of consecutive programs from any of the selector stations may be automatically tuned in. As the present automatic control covers five hours each day and four consecutive slots 67 in a peripheral row correspond to one hour's broadcast time, it is evident that each daily section must consist of twenty axial rows of slots 67 so as to cover a time period of 5 times 4 one-quarter hour periods, i. e. five hours.

As best shown in Figs. 11 and 12, eight arresters 90, one for each selectable broadcast station, are pivoted on a shaft 91 which is suitably mounted in the frame 55. Each of these arresters 90 is prevented in any suitable manner from sliding axially on the shaft 91 and is provided with a finger 92 in alignment with a peripheral station row of slots 67 (Fig. 11). The arresters 90 are normally urged into engagement with the periphery of the control drum by means of tension springs 93. It may be stated in advance that a broadcast for which the drum is conditioned will be automatically tuned in when the finger 92 of the arrester for the proper station drops into the exposed slot 67 which is identified with said broadcast.

Figure 5:
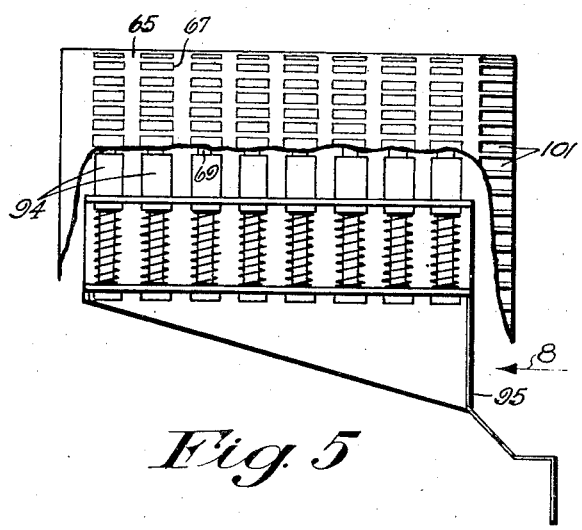
Fig. 5 is an elevational view of certain operating structure which cooperates with certain elements in the drum.
Figure 8:
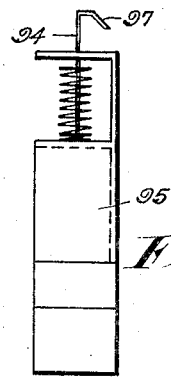
Fig. 8 is an end elevation of the structure shown in Fig. 5 as viewed in the direction of arrow 8.

As already mentioned, the drum is conditioned for selective broadcasts by exposing the corresponding slots 67 on presetting or depressing their respective fillers 69. In order to prevent that all of the fillers 69 in an axial row gravitate into the slot-exposing position 69a in Fig. 4 when the respective bar 82 is moved into filler-releasing position to allow depression of a certain filler and exposure of its slot 67, spring-urged plungers 94 (Fig. 5) are provided which engage the lower ends of the fillers 69 when the latter are in alignment with the fingers 92 of the arresters 90 as shown in Fig. 12. Hence, it is in this angular position of the slots 67 and fillers 69 that the drum is conditioned for selected programs, and it may be stated in advance that the points 92 of the arresters 90 are used to depress the fillers in the selected slots. The plungers 94 are carried by a bracket 95 which is mounted in any suitable manner on the frame 56 as at 96. The upper ends of the plungers 94 have inclined portions 97 (Fig. 8) against which the fillers 69 brush and slightly depress these plungers when the drum is indexed and while the same is at rest, respectively. Thus, on moving the bar 82 for the axial row of slots, which is presently in alignment with the fingers 92 of the arresters 90, inwardly with respect to the drum, the thereupon unlocked fillers 69 are prevented from gravitating into the depressed position 69a (Fig. 4) by the spring-urged plungers 94 and only that filler 69 will be depressed which is intended to be depressed by an arrester 90.

Figure 10:
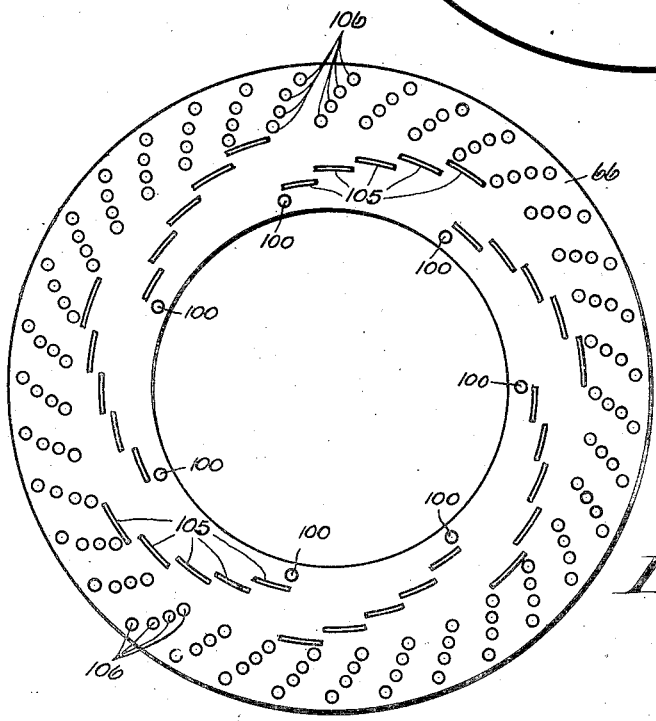
Figure 15:
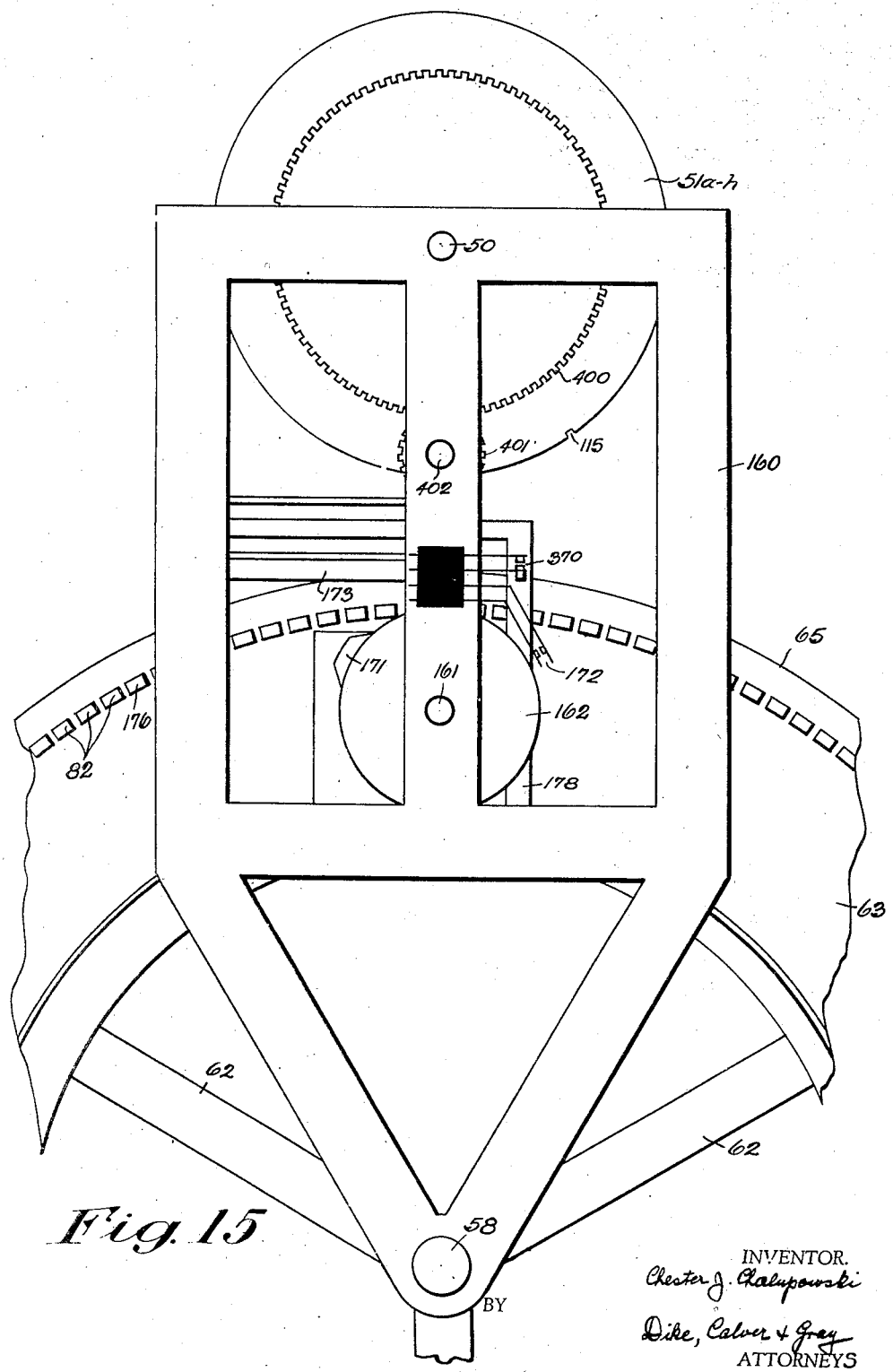
Fig. 15 is an enlarged, fragmentary elevational view of part of the automatic control as viewed in the direction of arrow 15 in Fig. 1.

As best shown in Figs. 1 and 10, the side disk 66 of the control drum is provided with seven equi-angularly spaced pins 100, each being identified with a certain day in the week. These pins 100 are adapted to be engaged by the day drum-index mechanism B and are spaced apart an angular distance which equals that of a day section of slots 67 on the drum. Thus, if the automatic control has not been used for several days and automatic control is then desired, the drum will be indexed through the medium of a sufficient number of consecutive pins 100 in order to bring the proper day section of slots 67 into operation position for the day on which the automatic control is turned on.

In order to index the drum through an angular distance equivalent to that between two consecutive slots 67 in a peripheral row, the drum periphery 65 is also provided with correspondingly spaced ratchet teeth 101 (see also Fig. 26) with which is adapted to cooperate a pawl 102 of the quarter-hour drum-index mechanism C to be described hereinafter.

The same side disk 66 of the drum is also provided with 7 equi-angularly spaced rows of uniformly staggered hour tracks 105, the equi-angularly spaced tracks in each row representing the five hours broadcast time on a certain day of the week. Within the angular region of each hour track 105 and nearer the periphery of the drum are four equi-angularly spaced and uniformly staggered pins 106 which represent the four quarter-hour intervals of each broadcast hour.

The other side disk 63 of the drum (Fig. 9) is provided with seven equi-angularly spaced and uniformly staggered tracks 107 which represent the 7 days of the week. A comparison between Figs. 9 and 10 indicates that the angular extent of each day track 107 is equal to the angular extent of the five hour tracks 105 for one day and the angular distance between two consecutive index pins 100. The various tracks 105 and 107 and the pins 106 on the two side disks of the drum are adapted to depress certain switches, to be described later, in order to control certain electrical circuits which are part of the day and quarter-hour drum index mechanisms B and C.

Pivoted on a shaft 110, which is suitably mounted in the frame 55, are eight tuning elements 111, one for each selective broadcast station. These elements 111 are in alignment with the corresponding station disks 51a—h as best shown in Figs. 11 and 12, and each of these elements 111 has a tongue 112 (Fig. 13) which engages a corresponding tongue 113 of its respective arrester 90. Hence, when the finger 92 of an arrester 90 drops into an exposed slot 67 in the drum periphery, the engaging tongues 113 and 112 of said arrester and of the corresponding tuning element 111, respectively, cause the latter to rock counter-clockwise as viewed in Fig. 12, whereby a finger 114 of the tuning element comes to bear against the periphery of the corresponding station disk 51a—h. The tuning elements 111 are made of slightly resilient material and their fingers 114 are so closely spaced from the peripheries of the station disks 51a—h that they are not only moved with their fingers 114 into engagement with said peripheries but are also tensioned when their respective arresters 90 drop with their fingers 92 into aligned slots 67 in the drum periphery. After the tuning device E has turned the station disks 51a—h sufficiently to bring a notch 115 in the periphery of one of these disks into alignment with the finger 114 of a tensioned tuning element 111, said finger snaps into said notch 115 and prevents further rotation of the station disks. It may be stated in advance that the tuning device E, which causes rotation of the gang condenser shaft 59 and, therefore, of the station disks 51a—h, is disconnected from its power source and rendered inoperative when the finger 114 of a tuning element 111 enters the peripheral notch 115 of a station disk. The angular disposition of the peripheral notch 115 in each station disk is such that the station represented by the disk is sharply tuned when its notch 115 is locked with the finger 114 of the corresponding tuning element 111.

*Day drum index mechanism B*

Referring to Figs. 1, 26, 28, the frame 55 is provided with a cage 120 in a rib 121 of which (Fig. 28) is suitably mounted a stub shaft 122 on which a gear disk 123 is freely rotatable and held against axial movement thereon in any suitable manner. The gear disk 123 carries an eccentric pin 124, received in an elongated slot 125 of a double arm lever 126 which is freely rotatably mounted on the drum shaft 58 and held against axial movement thereon in any suitable manner. The stub shaft 122 terminates at the front face 123a (Fig. 28) of the gear disk 123 in order not to interfere with the rocking motion of the lever 126 as caused by its connection with the eccentric pin 124 on the rotary gear disk 123. Pivotally mounted at 127 (Fig. 1) on the lower end of the lever 126 is a pawl 128 having a finger 129 which is adapted to cooperate with the day index pins 100 (Fig. 10) on the side disk 66 of the control drum. The pawl 128 is normally rocked clockwise as viewed in Fig. 1, i. e., out of cooperative relationship with the day index pins 100, by means of a tension spring 130. An electro-magnet 131 is also secured to the lower end of the lever 126. The core 132 of this electro-magnet will, on energization of the latter, rock the pawl 128 into cooperative relationship with the pins 100. The gear disk 123 is in permanent mesh with a gear 133 (Figs. 26 and 33) on a shaft 134 which is suitably journalled in the cage 120 and carries at one end a gear 135 which meshes with a pinion 136 (Fig. 1) on the shaft 137 of any suitable, small electric motor 138 which is suitably mounted on the cage 120. Thus, when this motor runs, the pawl-carrying lever 126 will be oscillated through intermediation of gears 136, 135, shaft 134, gear 133, gear disk 123, eccentric pin 124 and elongated slot 125 in said lever 126. Moreover, if the electro-magnet 131 is then energized, the pawl 128 is rocked into cooperative relationship with the day index pins 100 and indexes the control drum.

*Quarter hour index mechanism C*

The previously mentioned quarter-hour index pawl 102, which cooperates with the ratchet teeth 101 in the drum periphery, is pivotally carried at 140 (Fig. 26) on an arcuate extension 141 of a lever 142 which is freely rotatable on a stub shaft 143, suitably mounted in a rib 144 of the cage 120. The lever 142 is provided with an elongated slot 145 in which is received an eccentric pin 146 on a disk 147 at one end of the shaft 134 (see also Fig. 33). The pawl 102 has a laterally extending pin 148 which rests on one arm 149 of a bell crank lever 150 (Fig. 27) which is pivotally mounted at 151 in the cage 120 and normally rocked clockwise as viewed in Fig. 27 by a suitably mounted tension spring 152. Suitably mounted on the cage 120 is another electro-magnet 153. On energization of the electro-magnet 153, its core 154 attracts the bell crank lever 150, thereby rocking the same sufficiently counter-clockwise as viewed in Fig. 27 to permit the pawl 102 to drop into cooperative engagement with the ratchet teeth 101 in the drum periphery. It will now be understood that if the motor 138 (Fig. 1) runs and the electro-magnet 153 (Figs. 26 and 27) is energized, the control drum will be indexed through intermediation of gears 136 and 135, shaft 134, disk 147 (Fig. 26), eccentric pin 146 thereon, lever 142 with its arcuate extension 141, pawl 102 and the ratchet teeth 101 in the drum periphery. It appears from Fig. 26 that the pawl 102 is so constructed as to index the drum in the direction of the arrow 155 only, and will ride idly over said ratchet teeth when moving in the opposite direction. The eccentric stroke of the pin 146 on the disk 147 is equal to the distance between two consecutive ratchet teeth 101 on the drum periphery. Hence, the control drum is indexed by the pawl 102 in intermittent steps which are equal to the distance between two consecutive slots 67 in a peripheral row.

*Main control disk D*

Referring now to Figs. 1, 11 and 16 to 21, inclusive, the frame 55 is provided in any suitable manner with a second cage 160 wherein is rotatably but axially immovably mounted a stub 161, carrying a main control disk 162. That end of the stub 161 which projects outwardly beyond the cage 160 preferably extends through the front panel of the radio cabinet and has a knob thereon (neither shown) for manipulation of the control disk 162 from said front panel. The control disk 162 performs a different function in each of three preassigned angular positions into which the same may be manipulated. As best shown in Fig. 16, the disk 162 has on one face 163 and at the periphery thereof a cam track which consists of a slope 164 and a uniform crest 165. The slope 164 and crest 165 extend each over 120°, leaving a 120° gap between the beginning and end of the cam track. On its opposite face 166, the control disk 163 has the same cam track repeated, the same comprising a slope 167 and a uniform crest 168. The two cam tracks on the opposite faces of the control disk 162 are so disposed that their combined width W (Fig. 21) is uniform throughout. Hence, the cam slope 167 on the disk face 166 ascends from the latter at 169 (Fig. 16) at a place which is in axial alignment with the highest point 170 of the slope 164 on the opposite disk face 163, the cam crest 165 on the disk face 163 occupies the angular region of the gap between the opposite ends of the cam track on the disk face 166 and, conversely, the cam crest 168 on the disk face 166 occupies the angular region of the gap between the ends of the cam track on the disk face 163, all as shown in Fig. 16. The periphery of the control disk 162 is also provided with a cam lobe 171 which is adapted to close a switch 172 when the control disk assumes the angular position shown in Fig. 17, i. e., the "on" position in which the automatic control is rendered operative by virtue of the closing of the switch 172. In this angular position of the control disk 162, a rocker 173, which straddles the cam tracks of the control disk in the manner indicated in Figs. 20 and 21 and is pivotally mounted at 174 on the cage 160, assumes the dotted line position 173a in Fig. 21, because said rocker then cooperates with the cam crest 165 on the face 163 of the control disk, as will be readily understood. The rocker 173 is provided with a notch 175 in which the depending flanges 176 of the filler-locking bars 82 in the control drum are adapted to be received in the manner shown in Fig. 21. The notch 175 is just long enough to receive one of these flanges 176 at a time. In the "on" position of the control disk 162 as shown in Fig. 17, the rocker 173 is, as already mentioned, in the dotted line position 173a in Fig. 21 in which its notch 175 assumes the dotted line position 175a, i. e., is in alignment with the flanges 176 of the bars 82 when the same assume the filler-locking position 176a shown in Figs. 4 and 21. In the angular position of the control disk 162 shown in Fig. 18, the same is in the "off" position in which the switch-actuating cam lobe 171 is 120° removed from the switch 172, permitting the latter to assume its normal, open position and thereby disconnect the entire automatic control from its power source, and, hence, render it inoperative. During clockwise rotation of the control disk 162 from the "on" position in Fig. 17 into the "off" position in Fig. 18, the rocker 173 cooperates with the cam crest 165 of said control disk, with the result that said rocker remains in the dotted-line position 173a (Fig. 21). Thus, the notch 175 of the rocker 173 remains in alignment with the flanges 176 of the bars 82 in their filler-locking position when the control disk 162 is turned from the "on" position (Fig. 17) clockwise into the "off" position (Fig. 18), or when the same is turned from the "off" position counter-clockwise as viewed in Fig. 18 into the "on" position. In the "off" position of the control disk 162 (Fig. 18), its cam lobe 171 holds a "depressor" frame 178 depressed in the manner shown in Fig. 12. This frame 178 comprises two spaced, parallel bars 179 (Fig. 14) which are pivotally mounted with one end at 180 on the frame 55 and connected at their other ends by a cross bar 181 which overlies the tuning elements 111 in the manner best shown in Figs. 11 and 12, and 14. A spring 181a normally urges the depressor frame with its follower 178a toward the control disk 162. Thus, when the control disk 162 is rotated into the "off" position, the depressor frame 178 is rocked clockwise as viewed in Fig. 12, whereby the cross bar 181 thereof lowers whichever tuning element 111 happens to be in locking engagement with the corresponding station disk 51a—h and thereby releases the condenser shaft for manual control.

On turning the control disk 162 into the "selector" position shown in Figs. 19, 20 and 21, the rocker 173 cooperates with the cam crest 168 on the face 166 of said control disk, meaning that the rocker 173 is then in the full line position shown in Fig. 21 in which the bar 82, whose flange 176 is presently straddled by the rocker, is in its filler-releasing position and permits exposure of a selected slot 67 in the drum periphery in the earlier explained manner. The control disk 162 can be turned into the "selector" position only in counter-clockwise direction as viewed in Figs. 18 and 17 from either the "off" or the "on" position during which rotation the descending cam slope 164 on the disk face 163 and the opposite, ascending cam slope 167 on the disk face 166 cooperate to swing the rocker 173 from the dotted-line position 173a into the full-line position shown in Fig. 21. Clockwise rotation of the control disk 162 into the "selector" position (Fig. 20) is prevented by the adjacent ends 185 and 186 (Fig. 16) of the cam crests 165 and 168 which do not permit a cross-over of the rocker 173 from cooperative engagement with the one cam crest into cooperating engagement with the other cam crest, and vice versa. Hence, the operation of the control disk 162 is restricted to counter-clockwise rotation from the "off" position (Fig. 18) over the "on" position (Fig. 17) to the "selector" position (Fig. 19), and clockwise rotation from the "selector position" over the "on" position into the "off" position.

Tuning device E

Referring to Figs. 1 and 27, the shaft 50 of the gang condenser carries a disk 190 which is in frictional engagement with a grooved disk 191, rotatably mounted on a short stub 192 on the frame 55. Also frictionally drivingly engaging the grooved disk 191 is a segment 193 on one end of an arm 194, the other end of which is rotatably mounted on the drum shaft 58 and prevented from axial movement thereon in any suitable manner. The arm 194 is provided with an elongated slot 195, receiving an eccentric pin 196 on a gear disk 197 which is rotatably but axially immovably mounted on the previously mentioned stub shaft 143. This stub shaft 143 terminates at the front face 198 of the gear disk 197 so as not to interfere with the rocking motion of the arm 194 as caused by its engagement with the eccentric pin 196 of the rotary gear disk 198. The periphery 199 of the segment 193 is concentric to the axis of the drum shaft 58 and is of such length that that the same will, during its rocking motion in either direction, cause rotation of the condenser shaft 50 through an angular range commensurate with the maximum band spread required for tuning the eight selector stations. The gear disk 197 is driven by a pinion 200, provided by a friction-clutch member 201 (Fig. 34) which is rotatably mounted on the shaft 134 (see also Fig. 33) and whose frusto-conical surface 202 is held in frictional engagement with a corresponding frusto-conical surface 203 on said shaft 134 by means of a spring 204, one end of which bears against the bottom 205 of an annular recess 206 in said clutch member 201 and the other end of which bears against the adjacent wall portion 207 (Fig.

26) of the cage 120. Mounted on a cross-shaft 208 in the cage 120 (Fig. 27) is a small gear 208a which is in permanent mesh with the gear disk 197 and provided with a plurality of stop pins 208b that are adapted to be engaged by a finger 209 on a lever 210 which is pivotally mounted at 211 in the cage 120. A tension spring 212 normally holds the lever 210 and its finger 209 in operative relationship with the stop pins 208b. Mounted in any suitable manner on the cage 120 is an electro-magnet 213. On energization of this electro-magnet, its core 214 attracts the lever 210, thereby withdrawing the finger 209 from cooperative relationship with the stop pins 208 and thereby rendering the drive for the gear disk 197 operative by permitting the clutch member 201 to be frictionally driven by the cooperating clutch surface 203 on the shaft 134. It may be stated in advance that the electro-magnet 213 is energized while the gear disk 197, and hence, the condenser shaft, are rotated, and said electro-magnet is deenergized immediately after the finger 114 of the tuning element 111, which corresponds with the next selected station, drops into the notch 115 of its respective station disk 51a—h, (Figs. 11 and 12) thereby causing immediate return of the lever 210 and its finger 209 into operative alignment with the nearest stop pin 208b. Hence, after the finger 114 of the tuning element 111 has dropped into the notch 115 of the station disk and thereby locked the latter against further rotation, the friction drive from the shaft 134 to the clutch member 201 continues only for a very short time, i. e., until the next of the numerous stop pins 208b engages the finger 209 (Fig. 27), whereby the ensuing lost motion between the locked station disk and clutch member 201 is taken up by slippage of the driving segment 193 on the grooved disk 191 and/or slippage of the latter on the disk 190 on the condenser shaft 50 (Fig. 27).

*Circuit controllers F*

Before describing the various circuits of the automatic control, reference is had to several circuit controllers F. Referring to Figs. 1 and 29 to 32a, inclusive, the first circuit controller to be described comprises a stationary switchboard 220 and a rotary switch actuator 221. More particularly, the switchboard 220 is preferably in the form of a disk of insulating material which is mounted in any suitable manner in the cage 120 and carries three equi-angularly spaced sets 222, 223 and 224 of switches. The set 222 comprises five switches 225—229, respectively, the second set 223 comprises also five switches 230 to 234, respectively, and the last set 224 comprises the switches 235, 236, 237. All of these switches may be of the same construction as the switch 225 shown in Fig. 32, and may be mounted on the switchboard 220 in the same manner as said switch 225. The switch 225 comprises two conductive blades 230 which are suitably mounted on the rear face of the switchboard and project in a recess 231 of the latter. The blades 230 carry contacts 232 which are normally disengaged and may be brought into engagement with each other by depressing that switch blade 230 which extends beyond the front face 233 of the switchboard 220. Leads x and y may be connected in any suitable manner with the blades 230.

Adapted to cooperate with the switches on the board 220 is the switch actuator 221 which is rotatably mounted on the previously mentioned stub shaft 122 concentrically of said switchboard, and is provided with a gear 235 which is in permanent mesh with a pinion 236 (Figs. 26 and 30) of a friction clutch member 237 (Fig. 35) which is rotatably mounted on the shaft 134 (Figs. 26, 33 and 35) and normally urged with its frusto-conical surface 238 into frictional driving engagement with a corresponding frusto-conical surface 239 of the shaft 134 by means of a compression spring 240 (Fig. 26). One end of said spring 240 bears against the clutch member 237 and the other end thereof bears against the wall portion 241 of the cage 120. The switch actuator 221 is also provided with an annular cam track 242 of insulating material, being interrupted by a gap 243 and having a radial cam extension 244. The switches on the board 220 are so radially disposed with respect to the cam track 242 and its radial extension 244 that the track 242 closes only the switch 235 and the narrow neck 245 of the cam extension 244 closes the outermost switches 225 and 230 of the switch sets 222 and 223, respectively, and the middle switch 236 of the switch set 224.

The switch actuator 221 is, during each working cycle of the automatic control, indexed three times by the above-described drive. More particularly, in the home position of the switch actuator 221 the same assumes an angular position in which the radial axis W—W of its cam extension 244 is in alignment with the central axis X—X of the switch set 222 in the switchboard 220 (Fig. 29), thereby closing the switches of said set. The first indexing step of the switch actuator 221 from its home position in clockwise direction as viewed in Fig. 30, or in counterclockwise direction as viewed in Fig. 29, brings the axis W—W of the cam extension 244 into alignment with the central axis Y—Y of the switch set 223, in which position said cam extension closes the switches of said set. The following, second indexing step of the switch actuator 221 in the same direction brings the axis W—W of the cam extension 244 into alignment with the central axis Z—Z of the switch set 224, in which position said cam extension closes the switches 236 and 237, the other switch 235 of said set having been held closed by the annular cam track 242 since the start of the first indexing step of the switch actuator from its home position. The following, final indexing step of the switch actuator 221, still in the same direction, returns the cam extension 244 into its home position. Inasmuch as the shaft 134 is continuously driven during an entire working cycle of the automatic control, and as the switch actuator 221 has to be intermittently stopped during each working cycle in the above-mentioned positions sufficiently long to permit the performance of certain operations to be explained hereinafter, means are provided to intermittently interrupt the drive between the power-driven shaft 134 and said switch actuator 221. To this end, the switch actuator 221 is provided with three equi-angularly spaced pins 250 (Fig. 31) which are adapted to be engaged by a finger 251 (Fig. 27) of a double arm lever 252 which is pivotally mounted at 253 in the cage 120 and normally urged into cooperative relationship with one of the pins 250 by means of a tension spring 254. An electro-magnet 258 is suitably mounted on the cage 120. On energizing this electro-magnet, its core 257 attracts the lever 252, causing the finger 251 thereof to clear whichever stop pin 250 of the switch actuator 221 is in engagement therewith and thereby releasing said switch actuator for the next indexing step. It may be stated in advance that the electro-magnet 258 is energized only momentarily so that the finger 251 of the lever 252 returns into the path of the next stop pin 250 on the switch actuator immediately after the previously engaged stop pin 250 has cleared said finger. While the switch actuator 221 is thus intermittently stopped during a working cycle of the automatic control, the friction clutch element 237 (Figs. 26 and 35) is held non-rotatable and the therewith cooperating clutch surface 239 on the shaft 134 (Fig. 33) slips on the corresponding clutch surface 238 of said clutch element 237.

Figure 9:
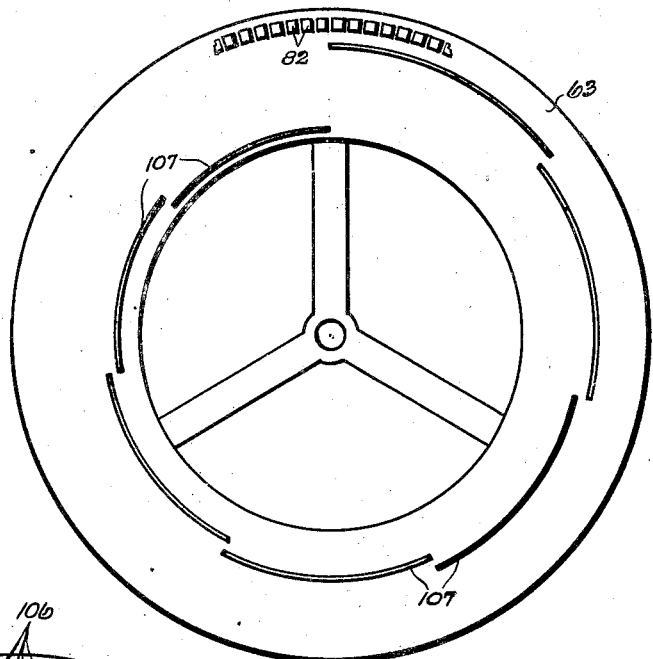
Figs. 9 and 10 are detail views of the opposite side walls of the drum.

Among the circuit controllers F are further switchboards 270 and 271 (Fig. 11) which are mounted on the frame 55 on opposite sides of the control drum. The switchboard 270 comprises 7 day switches 272a—g, one for each day in the week. Each of these switches is adapted to be closed by a corresponding day track 107 on the side disk 63 of the control drum (Figs. 1 and 9). The switchboard 271 comprises two sets of switches 273a—e and 274a—d. The switches 273a—e are hour switches and the switches 274a—d are quarter-hour switches. The hour switches 273a—e are adapted to be closed by the corresponding hour tracks 105 on the other side disk 66 of the drum (Figs. 1 and 10), and the quarter-hour switches 274a—d are adapted to be closed by the corresponding quarter-hour pins 106 on the same side disk 66 of the drum. The switchboards 270 and 271 are also shown in plan view in Figs. 22 and 23, respectively, and in section in Figs. 24 and 25, 25a, respectively. Accordingly, the switchboard 270 comprises a base 275 provided with a rib 275a of any suitable insulating material in which the various conductive blades of the switches 272a—g are mounted. Fig. 24 shows more particularly the construction of any one of the switches 272a—g which comprises three pairs of contact blades 276a and b, 277a and b, and 278a and b. The blade 278a is provided with a follower 279 and a depending insulating spacer 280 that bears against the switch blade 277a. Between the front ends of the switch blades 276b and 277a is another insulating spacer 281 which keeps these blades apart at all times. When the switch is not acted upon by its respective day track 107 on the control drum, the contacts of the two pairs of blades 277a and b and 278a and b are closed, whereas the contacts of the lowermost pair of blades 276a and b are disengaged from each other. If the control drum is indexed in the direction of the arrow 282 in Fig. 24, the proper day track 107 thereon will cooperate with the follower 279 and depress the blades 278a, 277a and 276b, the latter two through intermediation of the spacers 280 and 281. This causes opening of the contacts of the two pairs of blades 277a and b and 278a and b and closing of the contacts of the lowermost pair of blades 276a and b, as will be readily understood. Hence, while either one of the day switches 272a—g is not engaged by its respective day track 107 on the control drum, the contacts of two pairs of blades thereof are closed and those of the remaining pair of blades are open, and vice versa when the day switch is closed by its respective day track.

The switchboard 271 comprises a support 285, provided with a rib 286 of any suitable insulating material in which are suitably mounted the various blades of the hour switches 273a—e and of the quarter-hour switches 274a—d. Each one of the hour switches 273a—e is of the construction shown in Fig. 25 and consists of a pair of conductive blades 287a and b of which the blade 287b is provided with a follower 288, adapted to be engaged by its respective hour track 105 on the control drum. When the recording drum is indexed in the direction of the arrow 289 in Fig. 25, an hour track 105 will engage the follower 288 of the blade 287b and depress the same so that its contact will engage that of the other blade 287a, thereby closing the switch.

The construction of each of the quarter hour switches 274a—d is illustrated in Fig. 25a. Accordingly, each of the quarter hour switches comprises two pairs of conductive blades 290a and b and 291a and b, which are suitably mounted in the rib 286 of the switchboard 271. The blade 291a is provided with a follower 292, and an insulating spacer 293 is provided between the blades 290b and 291a so that the same will never contact each other and be depressed in unison with a quarter hour pin 106 on the control drum engages and depresses the follower 292 of the blade 291a, thereby opening the contacts of the blades 291a and b and closing the contacts of the blades 290a and b. This will happen when the control drum is indexed in the direction of the arrow 294 in Fig. 25a and the proper quarter-hour pin 106 moves into cooperative engagement with the follower 292 of the blade 291a. Hence, each of the quarter-hour switches has the contacts of one pair of blades closed and those of the other pair of blades open when the switch is not engaged by a quarter-hour pin 106, and vice versa when the switch is engaged by a quarter-hour pin 106.

Also included among the circuit controllers F is a manually operable day selector switch 300 (Fig. 37) which is preferably mounted on the front panel of the radio receiver so as to be manipulatable from the outside. This switch may be of any suitable construction, details of which are not shown as this is deemed unnecessary. As indicated in Fig. 37, the day selector switch consists of seven switch sections 301, one for each day in the week and each comprising three pairs 302, 303 and 304 of normally disengaged contacts. Preferably, the 7 sections of the switch are arranged circularly so as to be operable, one at a time, by a manually rotatable switch actuator (not shown). When the switch actuator actuates a certain day switch section of the selector switch, only the two contact pairs 303 and 304 of said switch section and not the third contact pair 302 thereof, and instead the contact pair 302 of the following day switch section, are closed. This follows clearly from the presently actuated Wednesday switch section, indicated W in Fig. 37, of which the contact pairs 303 and 304 are shown closed, and from the following Thursday section, indicated T, of which the contact pair 302 is shown closed.

As shown in Fig. 37, a contact of the third pair 304 of each day section of the selector switch 300 is connected with a corresponding contact 276a of the first pair 276a—b of each day switch on the switch board 270. The various pairs of contacts of the selector switch 300 and of the day switches on the switch board 270 are otherwise connected in circuits which will be fully described hereafter in connection with the wiring diagrams in Fig. 37.

Further included among the circuit controllers F is a clock (not shown) which is preferably electric and has a conductive hour hand 310 and a conductive minute hand 311 (Fig. 37). The hour hand 310 wipes in the course of twelve hours over twelve conductive tracks 312 which are narrowly spaced and insulated from each other so that said hour hand may, on leaving one track 312, immediately move into contact with the next track 312. The minute hand 311 wipes in the course of each hour over four quarter hour conductive tracks 313 which are also narrowly spaced and insulated from each other. An annular conductive track 314 is also provided with which the minute hand 311 is in permanent contact.

*Mode of operation*

Supposing it is 8:01 p. m. on Wednesday and the automatic control has been turned off on the same day between 6:30 p. m. and 6:45 p. m., and the drum is conditioned for a program for 8:00 p. m. Wednesday which is desired to be heard, the listener then turns the control disc 162 into the "on" position shown in Fig. 17, thereby closing the switch 172. Closing of the switch 172 (Fig. 37) results in the closing of an energizing circuit for an electro-magnet 315. This energizing circuit passes from one side of the input 316 and is continued through lead 317, closed switch 172, lead 318, the closed, first contact pair 302 of the Thursday section of the selector switch 300, lead 319, the closed, third contact pair 278a and b of the Thursday switch on the switchboard 270, leads 320 and 321, the winding of the electro-magnet 315, leads 322 and 323, the normally closed contact pair 291a and b of the first quarter-hour switch 274a on the switchboard 271, lead 324, switch 229 of the switch set 222 which is then closed by the cam extension 244 of the switch actuator 221 in its home position 244a shown in dash lines in Fig. 37, lead 325, the first quarter hour track 313a of the clock, the minute hand 311 which is then in contact with said track, the annular track 314 with which said minute hand is also in contact, lead 326, switch 225 of the switch set 222 which is then closed by the switch actuator 221 in its home position, leads 327 and 328 and back to the other side of the input 316. As soon as the electromagnet 315 is thus energized, its core 329 attracts a contact blade 330 and moves the latter into engagement with contacts 331 and 332 against the tendency of a tension spring 334 to move said blade 330 into engagement with a contact 333.

Engagement of the blade 330 with the contact 332 closes the circuit for the electric motor 138 from the lead 320 which is connected with one side 316a of the input 316 in the previously explained manner, through leads 335, 336 and 337, contact 332 and engaged blade 330, and through leads 338 and 339 to the other side of the input 316. Engagement of the blade 330 with the contact 331 closes the energizing circuit for the electro-magnet 258 (see also Fig. 27) which comprises the lead 320 and its previously mentioned connection with one side of the input, lead 340, the winding of the electro-magnet 258, lead 341, contact 331 and the therewith engaged blade 330, and leads 338 and 339 which pass to the other side of the input.

Hence, when the operator turns the control disc 162 on the outside of the receiver to the "on" position shown in Fig. 17, the electro-magnet 315 is immediately energized and attracts the contact blade 330, thereby closing the motor circuit as well as the energizing circuit for the electro-magnet 258. On energization of the electro-magnet 258, the lever 252 (Fig. 27) is attracted and its finger 251 withdrawn from stopping engagement with one of the pins 250 (Fig. 31) on the switch actuator 221, thus permitting the latter to be indexed from the home position into the first intermittent stop position in which its lateral cam extension 244 assumes the dot and dash line position 244b shown in Fig. 37 and closes the switches of the switch set 223 (see also Fig. 29). During this first indexing step of the switch actuator 221 from home position, the lateral cam extension 244 thereof soon moves out of switch-closing engagement with the switch set 222, whereupon the switches thereof return to their normal, open position and the energizing circuit for the electro-magnet 315 is thereby opened considerably before the lateral cam extension 244 arrives in the dot and dash line position 244b in Fig. 37. Hence, the contact blade 330 has already returned into engagement with the contact 333 when the switch actuator 221 arrives in its first intermittent stopping position. On the other hand, the circuit for the electric motor 138 remains closed from the time the switch actuator 221 starts from home position until it returns into the home position again. This is accomplished by a holding circuit for the motor 138 which is closed in any position of the switch actuator 221 except its home position. To this end, the gap 243 in the annular track 242 of the switch actuator is so arranged that the same bridges the switch 235 of the switch set 224 in the manner shown in Fig. 32a when the switch actuator is in its home position, while said annular track 242 keeps said switch 235 closed in any other angular position of the switch actuator. Closing of the switch 235 results in closing of the holding circuit of the motor which comprises the previously mentioned lead 320 with its connection with one side 316a of the input, leads 335 and 336, the switch 235 which is then closed by the annular track 242 of the switch actuator, and lead 339 which passes to the other side of the input.

Switch 230 of the set 223, which is closed by cam extension 244 of the switch actuator in its first intermittent stopping position, keeps the energizing circuit for the electro-magnet 153, which controls the operation of the quarter-hour drum indexing mechanism, closed until the drum is indexed in quarter-hour steps to such an extent that one of its hour tracks 105 and one of its quarter-hour pins 106 actuate that hour switch and that quarter-hour switch, respectively, on the switchboard 271 which is in electrical connection with the hour track 312a and quarter-hour track 313a, respectively, which are then contacted by the hour hand 310 and the minute hand 311, respectively. In other words, the drum is thus indexed in quarter-hour steps, until that axial row of slots 67 which corresponds to the time indicated by the clock arrives adjacent the fingers 92 of the arresters 90. In Fig. 37, the hour hand 310 just engages the 8 o'clock track 312a and the minute hand 311 is shown in conductive engagement with the first quarter-hour track 313a, thus indicating approximately 8:01 o'clock.

The energizing circuit for the electro-magnet 153 comprises the previously mentioned lead 320 with its connection with one side 316a of the input, lead 355, the winding of the electro-magnet 153, lead 356, contact 357, a yielding contact blade 358, lead 359, the then closed switch 230, leads 360 and 361, contact 333 and the contact blade 330 engaged therewith, and leads 338 and 339 which pass to the other side of the input.

As soon as the control drum is indexed in quarter-hour steps to the explained extent, the electro-magnet 315 is immediately reenergized in a manner to be explained presently. Inasmuch as the automatic control is turned on again at 8 p. m. or 8:01 p. m., i. e., at the time indicated by the hour and minute hands of the clock in Fig. 37, the drum is indexed in quarter-hour steps until an hour track 105 and a quarter-hour pin 106 on the drum close the 8 p. m. hour-switch 273d and the first quarter-hour switch 274a, respectively, on the switchboard 271. When these switches are thus acted upon, the electro-magnet 315 is reenergized and the energizing circuit comprises lead 320 with its connection with one side 316a of the input, lead 321, the winding of the electro-magnet 315, leads 322 and 323, the then closed contact pair 290a and b of the first quarter-hour switch 274a on the switchboard 271, lead 350, the then closed switch 234, leads 351 and 325, first quarter-hour track 313a of the clock, minute hand 311, hour hand 310, 8 p. m. hour track 312a which represents the hour between 8 and 9 p. m., lead 352, the then closed 8 p. m. hour switch 273d on the switch board 271, lead 353, the then closed first contact pair 276a and b of the Wednesday switch on the switch board 270, the then closed, third contact pair 304 of the Wednesday section of the selector switch 300, and leads 354 and 328 which pass to the other side of the input.

Reenergization of the electro-magnet 315 results in immediate movement of the contact blade 330 from engagement with contact 333 into engagement with the contacts 331 and 332. Of course, as soon as the contact blade 330 moves out of engagement with the contact 333, the above-described energizing circuit for the quarter-hour drum-index controlling electro-magnet 153 is opened, as will be readily understood. The reengagement of the contact blade 330 with the contact 331, on energization of the electro-magnet 315, again closes the previously described energizing circuit for the electro-magnet 258, resulting in withdrawal of the stop finger 251 (Fig. 27) from the then engaged stop pin 250 of the switch actuator 221 and permitting the indexing of the latter by the earlier described drive into the second intermittent stopping position in which its lateral cam extension 244 assumes the dotted line position 244c in Fig. 37. Again, the energizing circuit for the electro-magnet 315 is opened while the switch actuator moves through the last mentioned indexing step, as will be readily understood.

In the second intermittent stopping position of the switch actuator 221, the same closes the switches of the set 224 (see also Fig. 29). Closure of the switch 236 of this set results in closing of the energizing circuit for the electro-magnet 213 which controls the power drive for the condenser shaft 50. The energizing circuit for this electro-magnet 213 comprises lead 320 with its connection with one side of the input, lead 365, the winding of the electro-magnet 213, lead 366, the then closed switch 236, leads 367 and 361, contact 333, contact blade 330, and leads 338 and 339 which pass to the other side of the input. Energization of the electro-magnet 213 causes retraction of the stopping finger 209 (Fig. 27) from the presently engaged stop pin 208b of the gear 208a, permitting power rotation of the condenser shaft 50 in the previously explained manner until the notch 115 of one of the station disks 51a—h aligns with the finger 114 of the tuning element 111 which has been raised by that arrester 90 (Fig. 12) whose finger 92 has, at the end of the preceding drum indexing operation, been dropped into a slot 67. Thus, when the finger 114 of this tuning element 111 springs into the aligned notch 115 of the station disk, the condenser shaft 50 is thereby locked against further rotation in an angular position commensurate with the accurately tuned, pre-selected station. The continued drive from the motor 138 into the friction clutch element 201 becomes lost motion in the form of slippage of the clutch surface 203 of the shaft 134 on the clutch surface 203 of said clutch element 201 (Figs. 33 and 34). This slippage occurs, however, only momentarily as the tuning element 111 (Fig. 12), when its finger 114 springs into the notch 115 of the station disk, raises the depresser frame 178 sufficiently to cause a finger 178a thereon to close a normally open switch 370 (Figs. 11 and 37), thereby again closing the energizing circuit for the electro-magnet 315 which now comprises lead 320 with its connection with one side of the input, lead 321, the winding of electro-magnet 315, leads 322 and 371, the then closed switch 370, lead 372, the then closed switch 237, and lead 328 which passes to the other side of the input.

Thus, immediately after the finger 114 of the tuning element 111 drops in the notch 115 of the pre-selected station disk, switch 370 is closed and electro-magnet 315 reenergized. The reenergized electro-magnet 315 immediately attracts contact blade 330 and, hence, causes opening of the above-described energizing circuit for the electro-magnet 213, with the result that the stop finger 209 immediately returns into the path of rotation of the stop pins 208b (Fig. 27) for an early engagement with the nearest of said stop pins.

Reenergization of the electro-magnet 315 after the automatic closing of the switch 370 causes also reenergization of the electro-magnet 258 by virtue of the engagement of the contact blade 330 with the contact 331 and the consequent closing of the previously described energizing circuit for said electro-magnet 258. Reenergization of the electro-magnet 258 causes, on the other hand, withdrawal of the stop finger 251 from the then engaged stop pin 250 of the switch actuator 221, thereby releasing the latter for the last indexing step into home position in a manner well understood by now.

The holding circuit for the electric motor 138 is finally opened when the switch actuator 221 arrives in its home position and the gap 243 in the annular track 242 thereof again bridges the switch 235 in the manner shown in Fig. 32a. This concludes an operating cycle of the automatic control, and the same remains inoperative until the minute hand 311 of the clock contacts the second quarter-hour strip 313b thereof.

When this happens, and provided that the main control disc 162 has in the meantime not been turned to the "off" position, the electro-magnet 315 is immediately reenergized, starting thereby another cycle of operation of the automatic control which includes this time only one quarter-hour indexing step of the control drum, however, as will be readily understood. When the minute hand 311 of the clock mechanism assumes the dot-and-dash line position 311a in Fig. 37, the closed energizing circuit for the electro-magnet 315 is as follows: lead 320 with its connection with one side of the input 316, lead 321, the winding of said electro-magnet 315, leads 322 and 323, the then normally closed contact pair 291a and b of the second quarter-hour switch 274b on the switchboard 271, lead 324a, the then closed switch 228, lead 325a, the second quarter-hour clock track 313b, the minute hand 311 in its dot and dash line position 311a, the annular track 314, lead 326, the then closed switch 225, and leads 327 and 328 which pass to the other side of the input. Thus, re-energization of the electro-magnet 315, immediately after the minute hand 311 moves into contact with the second quarter-hour clock track 313b, starts a cycle of operation of the automatic control which is the same as the previously described cycle of operation, with several exceptions to be noted presently.

As only a quarter hour has elapsed since the last cycle of operation, it is evident that the control drum is indexed only one fifteen minute step. Furthermore, if the selected program extends over the second quarter hour, the presently active tuning element 111 will only briefly leave the notch 115 of its respective station disc (during the single indexing step of the drum) and then be returned into registry with the notch 115 of the same station disc when the follower 92 of the respective selector bar 90 drops into registry with the next, exposed notch 67 in the control drum. It is, therefore, evident that the depressor frame 178 is, at the end of said indexing step, again in the raised position in which its finger 187a closes the switch 370. Hence, the switch 370 is already closed when the switch actuator 221 arrives in its second intermittent stopping position which is the "tuning" position. This means that the electro-magnet 315 is immediately energized when the switch actuator 221 is in its second intermittent stopping position, with the result that the energizing circuit for the electro-magnet 213 remains open and the gear disk 198 (Fig. 27) of the condenser shaft drive is locked by the stop finger 209 through intermediation of a therewith engaged stop pin 208b on the gear 208a. Furthermore, immediate energization of the electro-magnet 315 upon the closing of switch 237 by the lateral cam extension 244 of the switch actuator before said cam extension arrives in the dotted line position 244c (Fig. 37) results in closing of the energizing circuit for the electro-magnet 258, with the result that the stop finger 251 (Fig. 27) is withdrawn from the path of rotation of the nearest stop pin 250 on the switch actuator 221 when the lateral cam extension thereof arrives in the dotted line position 244c. Under these circumstances, the switch actuator 221 then travels, without stopping, through the second intermittent stopping position and returns immediately to home position.

If a program from another station is recorded on the drum for Wednesday, starting at 8:30 p. m., the next operating cycle of the automatic control will again include a quarter hour indexing step of the control drum and this time also a retuning cycle, requiring an intermittent stop of the switch actuator 221 in the second intermittent stopping position, as will be readily understood. Evidently, the retuning operation will this time take place due to the fact that the last active arrester 90 will, at the end of this indexing step of the drum, not meet an exposed slot 67 in the drum, with the result that the finger 114 of the respective tuning element 111 will not be returned into registry with the aligned notch of the respective station disc, and no other tuning element may move into locking engagement with its station disc as its notch is out of alignment with the finger of said tuning element. This means that the depressed frame 178 is during the second intermittent stop of the switch actuator sufficiently depressed so as not to close the switch 370.

Hence, while the automatic control is turned on and after rendition of the first program to the expiration of the first quarter hour, the automatic control goes through an operating cycle every fifteen minutes in order to index the control drum every time a quarter-hour step regardless of whether the program or programs last fifteen minutes, one half hour or a whole hour. If the first program is a half hour program and the same is to be followed by a program from another station, it will be readily understood that the operating cycle of the automatic control at the expiration of the first half-hour program includes a retuning operation.

In the present instance, the automatic control is shown as being applicable between the hours of 5 o'clock and 10 o'clock, but it is to be distinctly understood that this is merely an example of the application of the invention as the same may be applied to cover any other hours of the day or night and also cover any other number of hours each day as this would require merely self-evident changes in the construction of the present automatic control which would clearly not involve invention.

Suppose this were Wednesday and the automatic control has not been turned on since Monday, it is then evident, that the Monday track 107, i. e., the one next to the innermost track 107 on the control drum, then closes the three contact pairs of the Monday switch on the day switchboard 270 in the same manner as the Wednesday switch is shown acted upon by the Wednesday track 107 on the drum in Fig. 37, meaning that the two contact pairs of the Monday switch, which are shown closed, would be open and the contact pair shown open would be closed. If the selector disk 162 is then turned into the "on" position and the switch 172 thereby closed, the switch actuator 221 is immediately indexed from the home position into its first intermittent stopping position in the previously described manner. However, when the switch actuator 221 reaches its first intermittent stopping position in which its lateral cam extension assumes the dot-and-dash line position 244b (Fig. 37), the day drum-index mechanism B will come into operation until the drum has been indexed to such an extent that its Wednesday track 107 acts upon the Wednesday switch on the day switchboard 270 in the manner shown in Fig. 37. This is due to the fact that it is now an electro-magnet 380 which is energized, instead of the quarter-hour drum-index controlling electro-magnet 153, when the switch actuator 221 is in the first intermittent stopping position. The energizing circuit for the electro-magnet 380 comprises the lead 320 with its connection with one side of the input 316, lead 381, the winding of the electro-magnet 380, lead 382, the then manually closed second contact pair 303 of the Wednesday section of the selector switch 300, lead 383, the then closed, second contact pair 277a and b of the Wednesday switch on the switchboard 270, and leads 354 and 328 which pass to the other side of the input. The thus energized electro-magnet 380 attracts the contact blade 358, thereby bringing the same into engagement with a contact 385 and closing the energizing circuit for the day drum-index controlling electro-magnet 131, said circuit comprising the lead 320 with its connection with one side of the input, lead 386, the winding of the electro-magnet 131, lead 387, contact 385, contact blade 358, lead 359, the then closed switch 230, leads 360 and 361, contact 333, contact blade 330, and leads 338 and 339 which pass to the other side of the input. Energization of the electro-magnet 131 causes immediate rocking of the pawl 128 into cooperative relation with the day index pins 100 on the drum (see also Fig. 1), and said pawl remains in cooperative relation with the said pins 100 until the control drum has been indexed thereby to such an extent that its Wednesday track 107 acts upon the Wednesday switch on the switchboard 270 in the manner shown in Fig. 37. When this occurs, the above-described energizing circuit for the electro-magnet 380 is immediately opened as can be readily seen from the wiring diagram in Fig. 37, permitting the spring-urged contact blade 358 to move into engagement with the contact 357 and thereby close the energizing circuit for the quarter-hour drum-index controlling electro-magnet 153. Thereupon, the quarter-hour drum-indexing mechanism will perform its previously explained operation until the control drum assumes the angular position commensurate with the time indicated by the hour and minute hands 310 and 311, respectively, of the clock.

In the "off" position of the control disk 162 shown in Fig. 18, the cam lobe 171 thereon keeps the depresser frame 178 in its "down" position, with the result that none of the tuning elements 111 is in holding engagement with a station disk and the receiver may be manually tuned. To this end, the condenser shaft 50 carries at one end a gear 400 (Fig. 1) which is in permanent mesh with a pinion 401 on a shaft 402 that preferably extends through the front panel of the receiver and carries a knob (not shown) for manipulation of the condenser shaft 50 through intermediation of shaft 402 and the gears 401 and 400.

For conditioning the drum for preferred programs, it is advisable to proceed in the following manner. Supposing the operator wishes to condition the drum for an hour program on a Wednesday or Wednesdays, he manually tunes in on a Wednesday the station from which the broadcast to be recorded originates within the first quarter of the hour during which the program will be broadcast. This will bring the notch 115 of the proper station disk 51a—h into alignment with the finger 114 of a tuning element. The operator thereupon turns the control disc 162 into the "selector" position shown in Fig. 19, thereby swinging the rocker 173 from the dot-and-dash line position 173a into the full line position shown in Fig. 21 and moving the therewith cooperating bar 82 out of locking engagement with the fillers 69 of that axial row on the drum which is in alignment with the fingers 92 of the arresters 90. The operator then manipulates the condenser shaft 50, through the previously described manual drive, slightly in both directions until the fingers 114 of the proper tuning element 111 springs into the aligned notch 115 of the proper station disk. This rocking movement of the tuning element 111 toward and into interlocking engagement with said station disk causes clockwise rocking (Fig. 12) of the corresponding arrester 90 and, hence, depression of a filler 69 into its slot 67 by the finger 92 of said arrester and against the tendency of the corresponding spring-urged plunger 94 (Fig. 5) to retain said filler in its slot-closing position. The operator thereupon returns the control disk 162 to its "off" position, thereby swinging the rocker 173 from the full-line into the dot-and-dash line position in Fig. 21 and moving the bar 82 into filler-locking position. The other fillers 69 in the same axial row will also be depressed to some extent by their arresters 90, but not sufficiently to become locked in slot-exposing position by the bar 82 as their respective tuning elements 111 are prevented to move into locking engagement with their respective station disks. The additional movement of the selected tuning element 111 from the periphery of its station disk into locking engagement therewith causes sufficient additional depression of the selected filler that the bar 82 will lock this filler in slot-exposing position. To accomplish this with assurance, the tooth 77 between the two notches 75 and 76 of each filler is tapered in the manner best shown in Fig. 6.

Thus, the control drum is conditioned for the first quarter-hour of the selected broadcast. The operator naturally performs the above-described task during each following quarter hour until the drum is conditioned for the entire hour program. If the selected hour program is to be followed by a half hour program from another station, for instance, the operator conditions the drum for this latter program by manually tuning in said other station during the first quarter hour of the time the program is to be broadcast and then proceeds in exactly the same manner as above described, only this time for a half hour rendition. In this manner, the control drum may be conditioned for rendition of any number of programs for an indefinite length of time, and expired programs or programs of no further interest may be readily replaced by others.

I claim:

1. The combination with a movable member, of an actuator therefor comprising a clock, a normally inoperative arrester for said member, a movable device carrying elements identified with preassigned time periods for predetermined days of the week and being presettable to condition said arrester for action when aligned with the latter, mechanism for moving said device, electrical means associated with said clock and including a manually operable day switch for each of said days to cause operation of said mechanism until the preset element corresponding to the clock time and the operated day switch aligns with the arrester, means locking said member to the conditioned arrester when the former is in a predetermined position only, a drive for said member, means becoming operative on alignment of said preset element with the arrester for rendering said drive operative, and means rendering said drive inoperative on locking said member to the arrester.

2. The combination with a movable member, of an actuator therefor comprising a clock, normally inoperative arresters adapted to arrest said member in different predetermined positions, respectively, a movable device carrying parallel series of transversely aligned elements, the rows of transversely aligned elements being identified with preassigned time periods for predetermined days of the week and being presettable to condition said arresters, respectively, for action when aligned with the latter, and all elements of each row aligning simultaneously with their respective arresters during movement of said device, mechanism for moving said device, electrical means associated with said clock and including a manually operable day switch for each of said days to cause operation of said mechanism until the row of elements which corresponds to the clock time and the operated day switch aligns with the arresters and thereafter cause operation of said mechanism at the start to each new time period to bring the corresponding row of elements into alinement with the arresters until only non-set elements align with said arresters, means locking the member to any conditioned arrester when the former is in the corresponding position only, a drive for said member, means becoming operative on alignment with the arresters of the rows of elements whose time identification coincides with the clock time and the operated day switch for rendering said drive operative, means rendering said drive inoperative on locking the member to a conditioned arrester, and means rendering any arrester inoperative on movement of a preset element from alignment therewith.

3. The combination with a movable member, of an actuator therefor comprising a clock, an arrester for said member, a movable device having chronologically arranged elements presettable to condition said arrester for action when aligned with the latter, mechanism for moving said device, electrical means associated with said clock to cause operation of said mechanism until the element synchronous with the clock time aligns with the arrester, means locking said member to the conditioned arrester when the former is in a predetermined position only, a drive for said member, means becoming operative on alignment of said synchronous element with the arrester for rendering said drive operative, and means rendering said drive inoperative on locking said member to the arrester.

4. The combination with a movable member, of an actuator therefor comprising a clock, a plurality of arresters for said member, a movable device having parallel series of transversely aligned elements chronologically arranged in each series and presettable to condition said arresters, respectively, for action when aligned with the latter, all transversely aligned elements aligning simultaneously with their respective arresters during movement of said device, mechanism for moving said device, electrical means associated with said clock to cause operation of said mechanism until the transversely aligned elements synchronous with the clock time align with the arresters, means locking said member to a conditioned arrester when the former is in a predetermined position only, a drive for said member, means becoming operative on alignment of said synchronous elements with the arresters for rendering said drive operative, and means rendering said drive inoperative on locking said member to an arrester.

5. The combination with a movable member, of an actuator therefor comprising a clock, a plurality of arresters for said member, a movable device having parallel series of transversely aligned elements chronologically arranged in each series and presettable to condition said arresters, respectively, for action when aligned with the latter, all transversely aligned elements aligning simultaneously with their respective arresters during movement of said device, mechanism for moving said device, electrical means associated with said clock to cause operation of said mechanism until the row of transversely aligned elements synchronous with the clock time aligns with the arresters and thereafter cause operation of said mechanism to bring consecutive rows of transversely aligned elements into alignment with the arresters in synchronism with advancing clock time, means locking said member to any conditioned arrester when the former is in a predetermined position only, a drive for said member, means becoming operative on alignment of said synchronous elements with the arresters for rendering said drive operative, and means rendering said drive inoperative on locking said member to an arrester.

CHESTER J. CHALUPOWSKI.